US010515056B2

(12) United States Patent
Chan et al.

(10) Patent No.: US 10,515,056 B2
(45) Date of Patent: Dec. 24, 2019

(54) API FOR RESOURCE DISCOVERY AND UTILIZATION

(71) Applicant: Razer (Asia-Pacific) Pte. Ltd., Singapore, OT (SG)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 503 days.

(21) Appl. No.: 14/221,095

(22) Filed: Mar. 20, 2014

(65) Prior Publication Data

US 2014/0289414 A1  Sep. 25, 2014

Related U.S. Application Data

(60) Provisional application No. 61/804,134, filed on Mar. 21, 2013.

(51) Int. Cl.
*G06F 15/16* (2006.01)
*G06F 13/00* (2006.01)
(Continued)

(52) U.S. Cl.
CPC .............. *G06F 16/178* (2019.01); *G06F 8/44* (2013.01); *G06F 9/54* (2013.01); *G06F 11/1464* (2013.01);
(Continued)

(58) Field of Classification Search
CPC ... H04W 4/001; H04W 4/003; G06F 209/509; G06F 9/465; G06F 9/5044; G06F 9/546
See application file for complete search history.

(56) References Cited

U.S. PATENT DOCUMENTS 8,607,086 B2   12/2013  Cullimore
8,769,610 B1 *  7/2014  Giguiere ................. H04L 63/20
                                                  726/1
(Continued)

FOREIGN PATENT DOCUMENTS

CN       101853179 A      10/2010
WO    WO-2014186858 A1 *  11/2014  ........... A63F 13/216

OTHER PUBLICATIONS

Daniel H. Craft, Resource management in a decentralized system, Oct. 10-13, 1983, ACM, New York, p. 11-19.*
(Continued)

*Primary Examiner* — Hee Soo Kim
*Assistant Examiner* — Ho T Shiu
(74) *Attorney, Agent, or Firm* — Mattingly & Malur, PC

(57) ABSTRACT

Various embodiments are disclosed for enabling multiple computing devices having a decentralized operating system to effectively monitor and manage resources across the multiple devices. In some embodiments, the systems are able to identify a set of local resources available for utilization by an application running on the decentralized operating system. A resource message identifying the set of local resources can be generated using a resource discovery and utilization application programming interface. This information can then be sent to a requestor (e.g., an application running on the decentralized operating system) which can create a resource utilization plan.

15 Claims, 7 Drawing Sheets

(51) Int. Cl.

| | |
|---|---|
| *G06F 15/173* | (2006.01) |
| *G06F 3/00* | (2006.01) |
| *G06F 9/44* | (2018.01) |
| *G06F 9/46* | (2006.01) |
| *H04L 9/00* | (2006.01) |
| *H04L 9/32* | (2006.01) |
| *G06F 16/178* | (2019.01) |
| *G06F 9/54* | (2006.01) |
| *G06F 16/16* | (2019.01) |
| *G06F 16/27* | (2019.01) |
| *G06F 16/11* | (2019.01) |
| *G06F 16/182* | (2019.01) |
| *G06F 16/17* | (2019.01) |
| *G06F 16/2457* | (2019.01) |
| *H04L 29/08* | (2006.01) |
| *G06F 11/14* | (2006.01) |
| *H04L 12/24* | (2006.01) |
| *H04L 12/911* | (2013.01) |
| *H04L 29/06* | (2006.01) |
| *H04W 12/06* | (2009.01) |
| *G06F 8/41* | (2018.01) |

(52) U.S. Cl.
CPC .......... *G06F 16/113* (2019.01); *G06F 16/116* (2019.01); *G06F 16/122* (2019.01); *G06F 16/16* (2019.01); *G06F 16/168* (2019.01); *G06F 16/1734* (2019.01); *G06F 16/1787* (2019.01); *G06F 16/182* (2019.01); *G06F 16/24578* (2019.01); *G06F 16/27* (2019.01); *H04L 41/0816* (2013.01); *H04L 47/70* (2013.01); *H04L 47/78* (2013.01); *H04L 63/0853* (2013.01); *H04L 67/06* (2013.01); *H04L 67/10* (2013.01); *H04L 67/1095* (2013.01); *H04L 67/1097* (2013.01); *H04L 67/22* (2013.01); *H04L 67/306* (2013.01); *H04L 69/04* (2013.01); *H04W 12/06* (2013.01); *G06F 11/1451* (2013.01); *G06F 11/1469* (2013.01)

(56) References Cited

U.S. PATENT DOCUMENTS

| | | | |
|---|---|---|---|
| 2004/0088397 | A1* | 5/2004 | Becker .................. G06F 8/60 709/223 |
| 2004/0268340 | A1 | 12/2004 | Steeb et al. |
| 2005/0125486 | A1* | 6/2005 | Chrysanthakopoulos .................. G06F 9/465 709/201 |
| 2005/0256923 | A1 | 11/2005 | Adachi |
| 2005/0273511 | A1* | 12/2005 | Ferreira de Andrade .................. G06F 9/5027 709/227 |
| 2006/0200702 | A1 | 9/2006 | Canning et al. |
| 2007/0174815 | A1* | 7/2007 | Chrysanthakopoulos .................. H04L 67/02 717/120 |
| 2009/0254605 | A1* | 10/2009 | Clavel .................. G06F 9/5044 709/203 |
| 2011/0093567 | A1 | 4/2011 | Jeon et al. |
| 2012/0042006 | A1* | 2/2012 | Kiley ................ G06F 17/30867 709/203 |
| 2012/0137305 | A1 | 5/2012 | Conroy et al. |
| 2012/0289147 | A1* | 11/2012 | Raleigh ............... H04L 67/2847 455/3.06 |
| 2013/0007203 | A1 | 1/2013 | Szu |
| 2013/0061070 | A1 | 3/2013 | Cullimore |
| 2014/0235258 | A1* | 8/2014 | Chen .................... H04W 4/003 455/452.1 |
| 2016/0059125 | A1* | 3/2016 | Georgiev .............. A63F 13/216 463/31 |

OTHER PUBLICATIONS

U.S. Appl. No. 14/221,161 by Chan, M.A. et al., filed Mar. 21, 2014.
U.S. Appl. No. 14/179,778 by Bornstein, Daniel R., filed Feb. 13, 2014.
International Search Report for International Application PCT/US2014/031376 dated Aug. 21, 2014.
Jan. 5, 2018 Office Action and Search Report issued in Taiwanese Patent Application No. 103110661.

\* cited by examiner

API FOR RESOURCE DISCOVERY AND UTILIZATION

CROSS-REFERENCES TO RELATED APPLICATIONS

This application claims the benefit of U.S. provisional application No. 61/804,134, filed Mar. 21, 2013, which is hereby incorporated by reference in its entirety for all purposes.

TECHNICAL FIELD

Various embodiments generally relate to decentralized operating systems spanning multiple devices. More specifically, some embodiments relate to an application programming interface (API) for resource discovery and utilization across the multiple devices.

BACKGROUND

Computing devices, such as mobile phones, smartphones, and tablet computers, have become ubiquitous in today's society. In fact, many individuals use a number of computing devices to perform various tasks during the course of their day. For instance, a person/user may use a laptop for work, a tablet for entertainment, a smartphone for phone calls, etc. Further, given the convergence of capabilities amongst the various computing devices, the user may use any of the computing devices to perform many of their tasks. While the general capabilities of the devices may be converging, any specific capability may be different. For example, each device may have a different amount of memory, different processors capabilities, different types of cameras, etc.

While computing devices have become able to communicate through various communication protocols, there has been no efficient way for these devices to interoperate. In fact, each computing device has traditionally been completely independent. For example, each computing device typically has their own operating system to manage the unique hardware resources available only to that computing device.

SUMMARY

Various embodiments generally relate to decentralized operating systems spanning multiple devices. More specifically, some embodiments relate to an application programming interface (API) for resource discovery and utilization across multiple devices. In accordance with some embodiments, resource information about one or more computing devices can be gathered. The resource information may be the result of a recent query using a resource discovery and utilization API. In other cases, the resource information may have been previously gathered.

A resource management and utilization plan can be generated based on information provided by a requestor(s) (e.g., an application, DCOS, etc.) about the use of the resources and the resource information returned from the multiple computing devices. For example, an application may be interested in generating a precise location of the user. The application can generate a resource query using the resource management and utilization API. Using resource information and ephemeral information, the application can determine which GPS, other resource, or combination thereof to use in determining the user's location.

Once the resource management and utilization plan has been created, at least a portion of the plan can be communicated to each computing device which in turn can locally manage the resources in accordance with the instructions received. Over time the resources can change. For example, a user may remove an external peripheral resource, or a local computing device may fail to communicate within a needed period. As such, the original resource utilization plan may need to be updated.

Embodiments of the present technology also include computer-readable storage media containing sets of instructions to cause one or more processors to perform the methods, variations of the methods, and other operations described herein.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
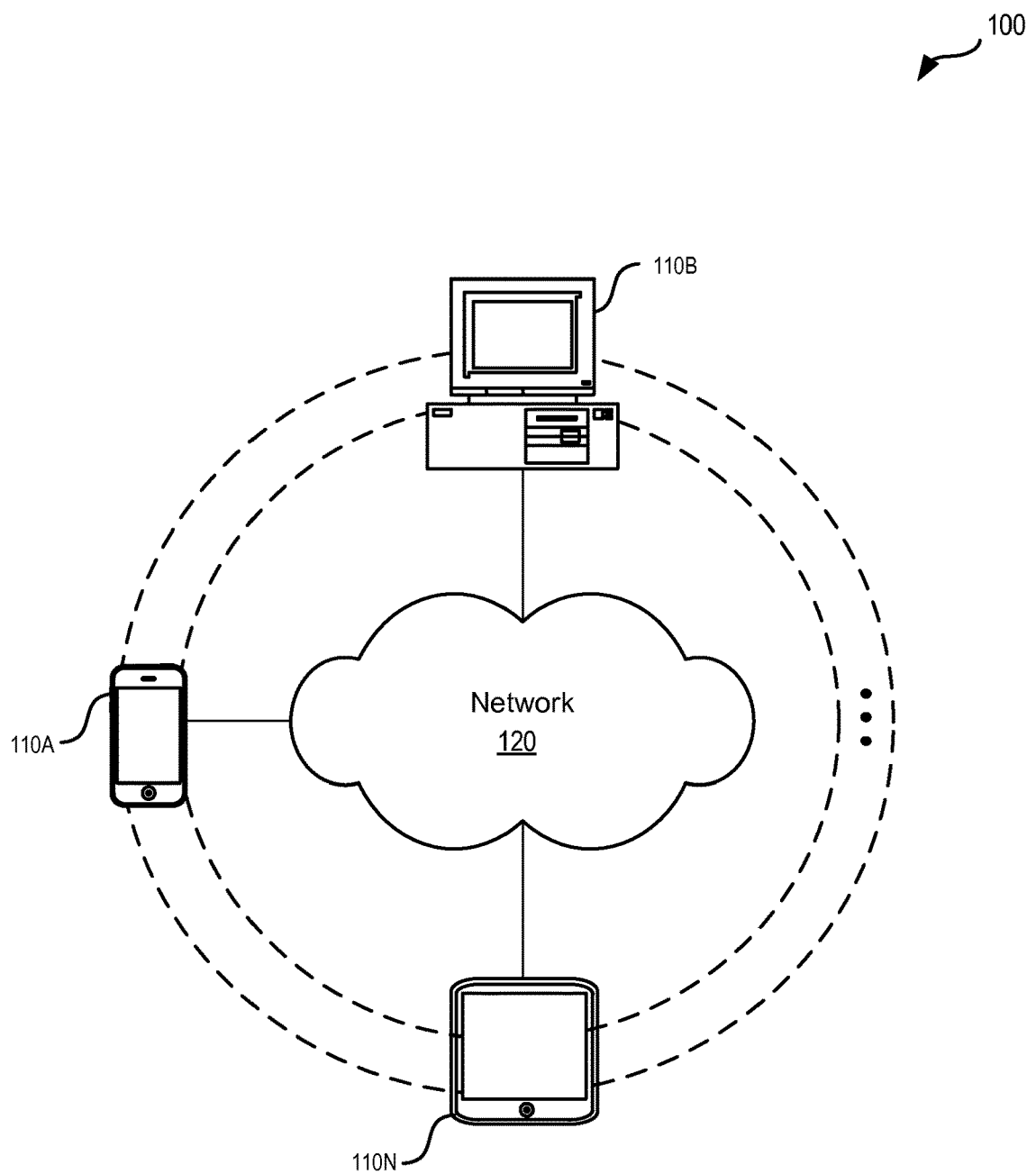
FIG. 1 illustrates an example of a network-based environment of multiple computing devices having a decentralized operating system in accordance with various embodiments of the technology.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments generally relate to decentralized operating systems spanning multiple devices. More specifically, some embodiments relate to an application programming interface (API) for peripheral discovery and utilization across the multiple computing devices. In some embodiments, the computing devices may have a decentralized operating system ("DCOS") that manages the multiple computing devices as a single entity. As a result, the resources of each of the computing devices can be shared and/or utilized based on a determined optimal utilization plan.

In some embodiments, a resource identification request can be received by a computing device (or at the DCOS). The resource identification request can originate from an application, DCOS, one of the computing devices, or other component. The resource identification request can be sent in accordance with the resource discovery and management API. In accordance with various embodiments, the resource identification request may be a generic request asking one or more computing devices to identify available resources. In other cases, the resource identification request may be a specific request asking one or more computing devices to identify a particular class of resources (e.g., memory, sensors, actuator, input devices, etc.).

Upon receiving the resource identification request, a computing device (or other component) can determine available resources. Resource information (e.g., regarding device capabilities) may be gathered in addition to additional ephemeral information (e.g., current utilization, amount of time since the resource was added or last used, current communication or network latencies, current physical location, time stamp, etc.). The type of information gathered may be standard or may be customized based on the resource identification request that was received. Once the information has been gathered, a resource message can be generated using the API that is responsive to the resource identification request and transmitted to the requestor. This information can be used to determine one more resource utilization plans.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. While, for convenience, embodiments of the present invention are described with reference to a decentralized operating system, embodiments of the present invention are equally applicable to various other types of operating systems and interactions of multiple computing devices capable of sharing resources.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

If the specification states a component or feature "may," "can," "could," or "might" be included or have a characteristic, that particular component or feature is not required to be included or have the characteristic.

General Description

FIG. 1 illustrates an example of a network-based environment 100 of multiple computing devices having a decentralized operating system in accordance with various embodiments of the technology. As illustrated in FIG. 1, network-based environment 100 may include one or more computing devices 110A-110N (such as a mobile device, a mobile phone, a tablet computer, a laptop, a mobile media device, a mobile gaming device, a vehicle-based computer, a smart television, a wearable computing technology, etc.). In accordance with various embodiments, computing devices 110A-110N may have a decentralized operating system ("DCOS") that manages multiple computing devices 110A-110N as a single entity. As a result, each of the computing devices 110A-110N can use resources from any of the other computing devices.

An application can be installed on an application layer of the DCOS. As a result, any of the computing devices being managed by the DCOS can invoke the application installed on the application layer of the DCOS. Thus, a separate installation of the application on each of the computing devices is not required to execute the application through any of the computing devices if the application is installed through the DCOS managing the computing devices.

In some embodiments, an instance of the DCOS executes using the hardware resources of the multiple computing devices and manages the hardware resources of all the computing devices as a single entity. The various components of the DCOS (e.g., file system of the DCOS) can be stored across the hardware resources of the multiple computing devices. For instance, the data associated with a file system of the DCOS can be stored across the memory resources of the various computing devices. The DCOS gathers any required data associated with the file system from across the computing devices when needing to provide access the file system.

Similarly, the execution of an instance of the DCOS can be performed using the hardware resources that are available across the computing devices. For instance, when a thread associated with the executing instance of this DCOS wants to execute a function, a kernel of the DCOS translates the function into data processing instructions and coordinates the various local OS kernels managing the hardware resources (e.g., CPU, memory, etc.) of each of the computing devices to execute the instructions.

In one or more embodiments, the DCOS can manage the multiple computing devices 110A-110N as a single entity by networking all of the multiple computing devices 110A-110N. The multiple computing devices 110A-110N may communicate with each other through a network 120. The computing devices 110A-110N can include network communication components that enable the computing devices 110A-110N to communicate with network 120 or other electronic devices by transmitting and receiving wireless signals using licensed, semi-licensed or unlicensed spectrum over network 120. In some cases, network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Figure 2:
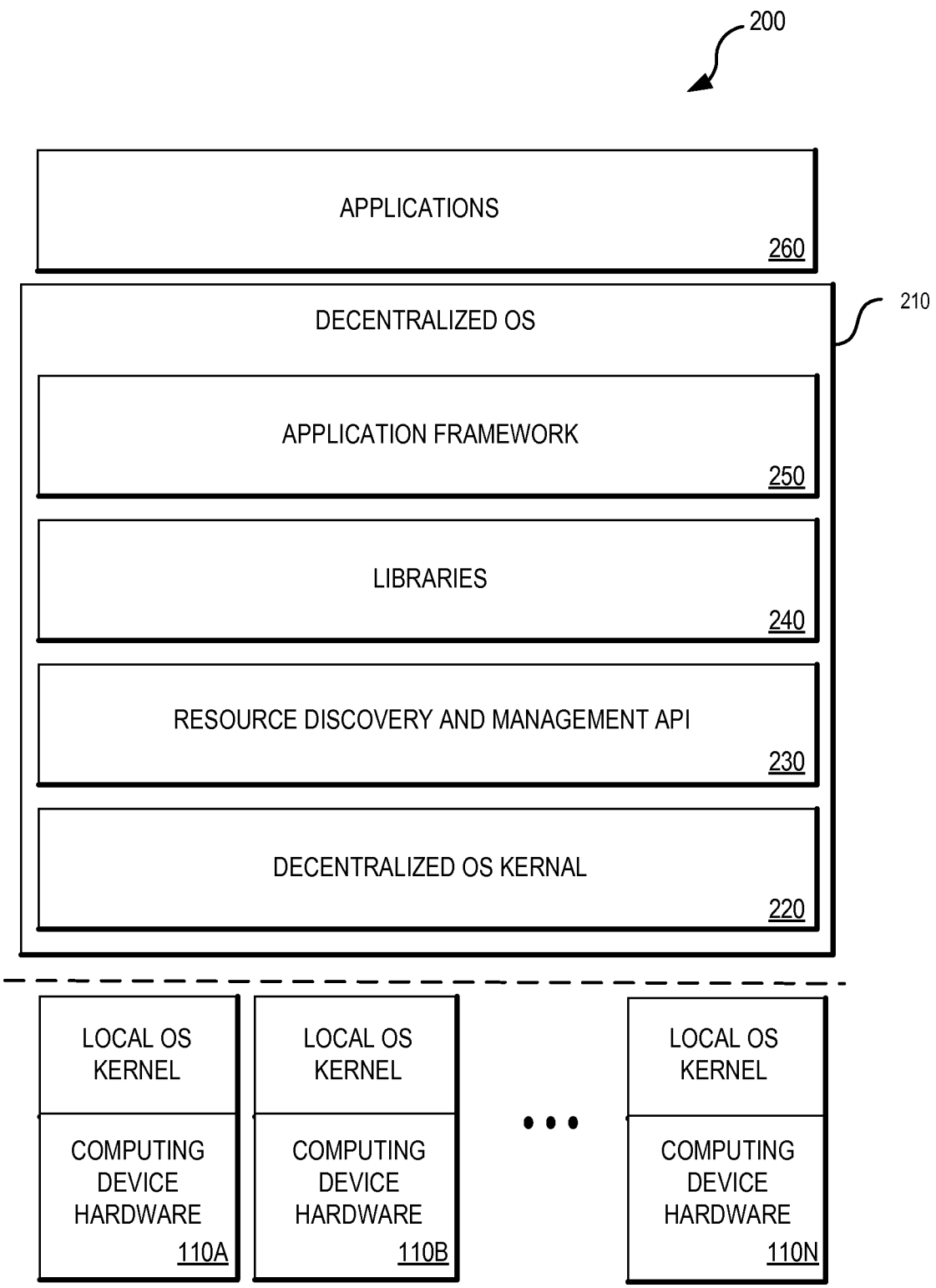
FIG. 2 is a block diagram illustrating an example of components in a network-based environment of multiple computing devices in accordance with one or more embodiments of the technology.

FIG. 2 is a block diagram illustrating an example of components in a network-based environment of multiple computing devices in accordance with one or more embodiments of the technology. The environment 200 can include multiple computing devices 110A-110N that are managed as a single entity by an instance of a DCOS 210 that executes using the hardware resources of the multiple computing devices 110A-110N. As illustrated in FIG. 2, the DCOS 210 may be interposed between the executing applications and the physical hardware resources of the various computing devices 110A-110N to manage/execute the physical hardware resources on behalf of the executing applications. The DCOS 210 can include a DCOS kernel 220 that allows the DCOS 210 to manage the hardware resources of the various computing devices 110A-110N as a single entity.

The computing devices 110A-110N can be a desktop computer, a laptop computer, a tablet computer, a game console, a smart phone, a personal digital assistant, wearable computer, or other electronic devices capable of running computer applications, as contemplated by a person having ordinary skill in the art. The hardware resources of the various computing devices 110A-110N can include central processing units ("CPU"), storage devices, graphics processing units ("GPU"), network communication hardware, a display screen, a video camera, a microphone, accelerometers, gyroscopes, global positioning receivers, environmental sensors, actuators, etc. In some embodiments, the DCOS kernel 220 manages memory access for the storage modules in the various computing devices 110A-110N, determines which applications get access to which hardware resources, maintains a file system to manage the user/application data, and sets up or resets the operating states of CPUs (of computing devices 110A-110N) for optimal operation at all times. In various embodiments, DCOS kernel 220 includes firmware and device drivers that control hardware resources of computing devices 110A-110N at a basic level.

In one or more embodiments, DCOS 210 includes resource discovery and management application programming interfaces ("API") 230 that can interact with local OS kernels (e.g., a Linux kernel) that each directly manage the hardware resources of a respective computing device 110A-110N. Resource discovery and management API 230 can provide the interface for generating resource queries and sending instructions for managing the local resources. In some embodiments, DCOS kernel 220 can use the local OS kernels to control the various hardware resources to perform the tasks/services provided by the DCOS kernel 220.

In various embodiments, DCOS kernel 220 maintains a mapping between the various local OS kernels and the hardware resources that are managed by the local OS kernels. DCOS kernel 220 may uses the mapping and the resource discovery and management API to send a request to the local OS kernel that manages the local resources. The local OS kernel then uses firmware to control the resource (e.g., a hard drive, sensor, actuator, etc.).

In embodiments, DCOS 220 can include libraries 240 that enable various operating system related tasks, e.g., file manipulation, to be performed. In some embodiments, the libraries 240 can be written in C, C++, or another programming language. The libraries 240 include, for example, a library to manage the display and windowing manager, a library to support various audio and video formats and codecs, including their playback and recording, a library for rendering 2D and 3D graphics, a database library to support a database engine, etc. In embodiments, the libraries 240 can be stored by DCOS 210 across the storage devices of the computing devices 110A-110N.

In some embodiments, the DCOS 210 can include an application framework 250 that offers an array of APIs that can be re-used by developers to perform various standard functions. The applications executing on DCOS 210 can interact directly with the application framework 250 when a standard function included within the application framework 250 is to be executed. In various embodiments, the application framework 250 may include a manager that manages the activities that govern the application life cycle, a manager that enables the applications to create customized alerts, views that are used to create layouts, including components such as grids, lists, buttons, etc., a manager to manage external resources used by the applications, a content provider to enable sharing of data between applications, etc. Resource discovery and management API 230 may be a part of application framework 250 in some embodiments.

In accordance with various embodiments, the application framework 250 can be stored by the DCOS 210 across the storage devices of the computing devices 110A-110N. It should be noted that the above description of the various components of the DCOS 210 are not intended to be exhaustive. The DCOS 210 can include other components that are required for the DCOS 210 to function or can improve the performance of the DCOS 102 as contemplated by a person having ordinary skill in the art. Further, the architecture of the DCOS 210 provided in FIG. 2 is intended as an illustrative example. Therefore, the DCOS 210 can include other architectures as contemplated by a person having ordinary skill in the art.

As illustrated in FIG. 2, the environment 200 can include an application layer 260 consisting of the various computer applications installed on the DCOS 210 and stored using the storage devices of the computing devices 110A-110N. The computer applications installed on DCOS 210 can include applications for general productivity and information retrieval, including email, calendar, contacts, and stock market and weather information. The computer applications can also include applications in other categories, such as mobile games, factory automation, GPS and location-based services, banking, order-tracking, ticket purchases or any other categories as contemplated by a person having ordinary skill in the art.

In some embodiments, an instance of DCOS 210 executes using the hardware resources of the multiple computing devices 110A-110N and manages the hardware resources of all the computing devices 110A-110N as a single entity. For instance, a thread associated with DCOS 210 can be executed by the DCOS 210 with the resources associated with one of the local OS kernels, where the thread related functions are executed by a CPU associated with the local OS kernel. When the thread wants to execute a function, the DCOS kernel 210 translates the function into data processing instructions and coordinates with the local OS kernel managing the hardware resources (e.g., CPU, memory, etc.) to execute the instructions.

Figure 3:
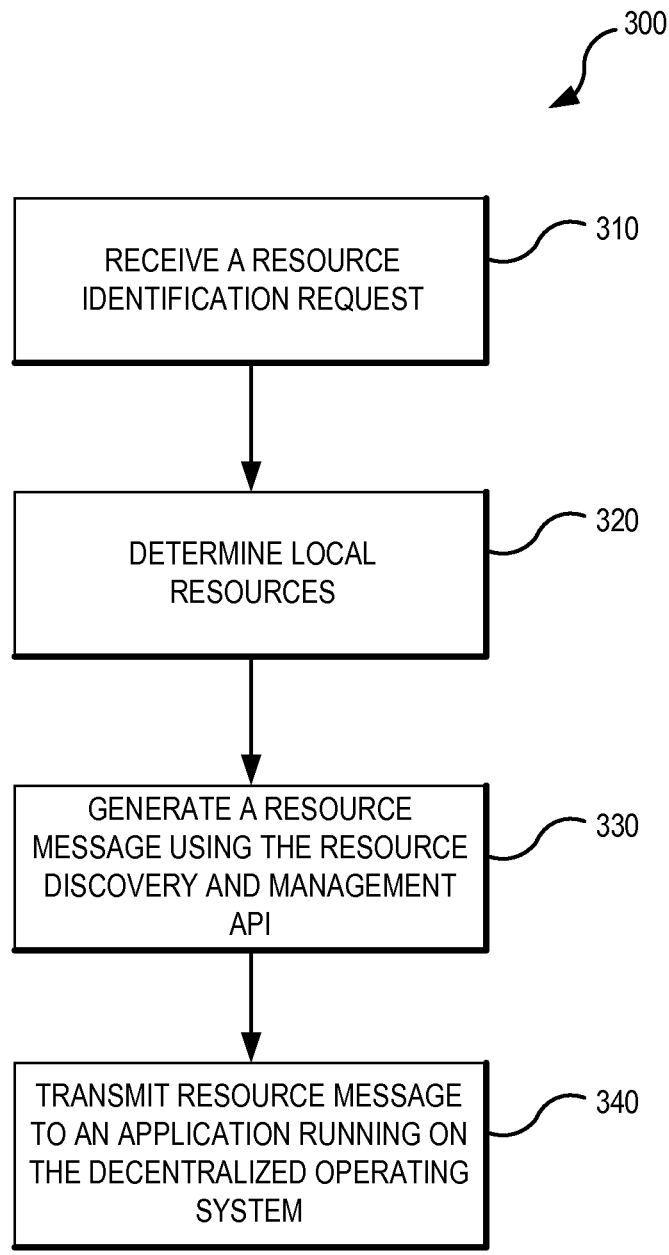
FIG. 3 is a flow diagram illustrating various operations for using a resource discovery and utilization application programming interface to determine local resources in accordance with some embodiments of the technology.

FIG. 3 is a flow diagram illustrating various operations 300 for using a resource discovery and utilization API to determine local resources in accordance with some embodiments of the technology. As illustrated in FIG. 3, receiving operation 310 receives a resource identification request. The resource identification request can originate from the DCOS, an application, or other component. In some embodiments, the resource identification request is sent in accordance with the resource discovery and management API. The resource identification request may be a generic request asking one or more computing devices to identify available resources. In other cases, the resource identification request may be a specific request asking one or more computing devices to identify a particular class of resources (e.g., memory, sensors, actuator, input devices, etc.).

Upon receiving the resource identification request, a computing device can determine, during determination operation 320, local resources. During determination operation 320, resource information (e.g., regarding device capabilities) may be gathered in addition to additional ephemeral information (e.g., current utilization, amount of time since the resource was added or last used, current communication or network latencies, current physical location, time stamp, etc.). The type of information gathered may be standard or may be customized based on the resource identification request that was received. Once the information has been gathered, generation operation 330 can generate a resource message that is responsive to the resource identification request. Transmission operation 340 then transmits the resource message to the requestor (e.g., an application) associated with the DCOS.

Figure 4:
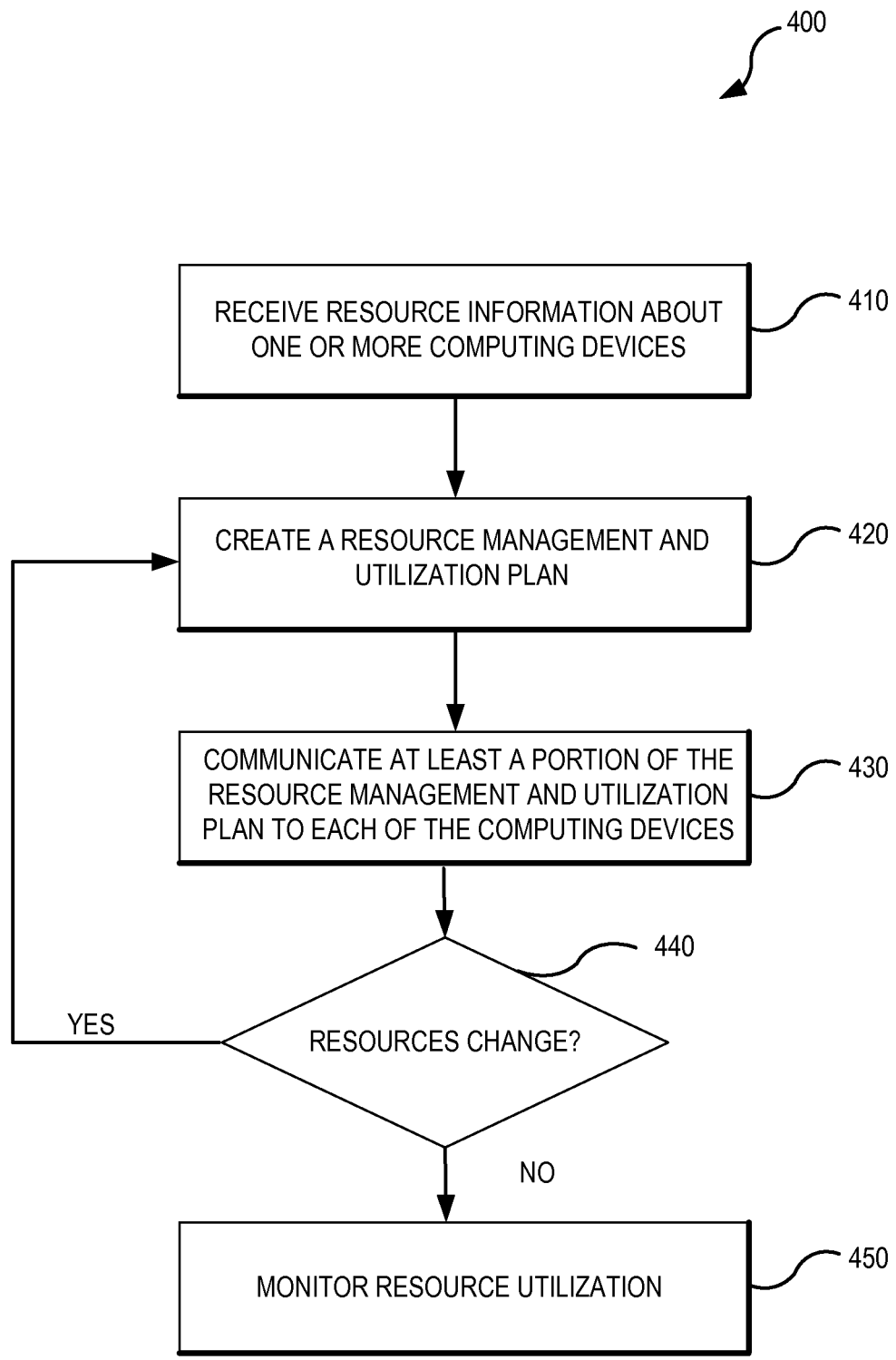
FIG. 4 is a flow diagram illustrating various operations for creating a management and utilization plan for resources of the multiple computing devices in accordance with various embodiments of the technology.

FIG. 4 is a flow diagram illustrating various operations 400 for creating a management and utilization plan for resources of the multiple computing devices in accordance with various embodiments of the technology. As illustrated in FIG. 4, receiving operation 410 receives resource information about one or more computing devices. The resource information may be the result of a recent query using the resource discovery and utilization API. In other cases, the resource information may have been previously gathered.

Creation operation 420 creates a resource management and utilization plan based on information provided by the requestor(s) (e.g., an application, DCOS, etc.) about the use of the resources and the resource information returned. For example, an application may be interested in generating a precise location of the user. The application can generate a resource query using the resource management and utilization API. Using resource information and ephemeral information, the application can determine the best resource or set of resources (e.g., GPS receivers, location-based services, antenna patterns, roaming patterns, etc.) to use in determining the user's location.

Once the resource management and utilization plan has been created, communication operation 430 transmits at least a portion of the plan to each computing device which can locally manage the resources. Over time the resources can change. For example, a user may remove an external peripheral resource or a local computing device may fail to communicate within a needed period. As such, determination operation 440 determines if the resources have changed. If determination operation 440 determines that the resources have changed in a way that the resource management and utilization cannot effectively be implemented, then determination operation 440 branches to creation operation 420 where a new resource management and utilization plan is created or the original plan is updated. If determination operation 440 determines that the resources have not changed in a way that the resource management and utilization cannot effectively be implemented, then determination operation 440 branches to monitoring operation 450 where the resources are monitored for future changes.

Figure 5:
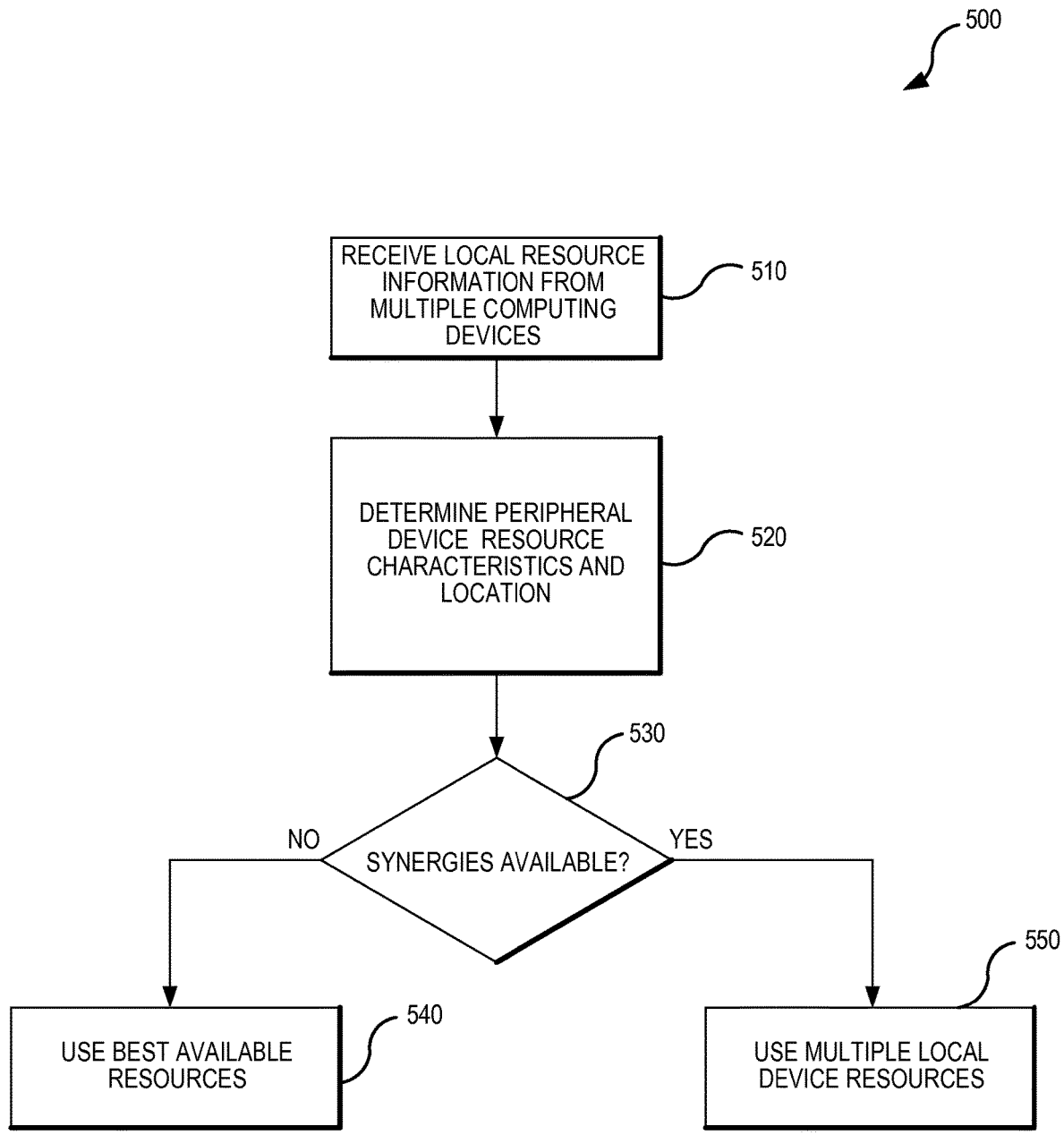
FIG. 5 is a flow diagram illustrating various operations for determining which resources to use in accordance with one or more embodiments of the technology.

FIG. 5 is a flow diagram illustrating various operations 500 for determining which resources to use in accordance with one or more embodiments of the technology. As illustrated in FIG. 5, receiving operation 510 receives local resource information from multiple computing devices. Characterization operation 520 determines device resource characteristics and location. Using information about the device characteristics and/or location, determination operation 530 determines if a combination of two or more resources would create synergies not available from single resource.

For example, for a computationally intensive computation, determination operation 530 may determine if the computation may be parallelized and split across multiple resources allowing for a faster computation time than a resource could generate by itself. As another example, for a visualization request, determination operation 530 may determine if multiple screens from the devices can be used to create a better experience. Determination operation 530 can use a variety of information about the resources and ultimate task in making this determination. For example, in some embodiments, resource capabilities, physical location, current and/or historical communication latencies, power statuses of the computing devices, and other factors may be used.

If determination operation 530 determines that synergies are not available from using multiple resources, then determination operation 530 branches to best resource utilization operation 540 where the best resource is selected and utilized. If determination operation 530 determines that synergies are available from using multiple resources, then determination operation 540 branches to multiple resource utilization 550 where multiple resources are utilized.

Figure 6:
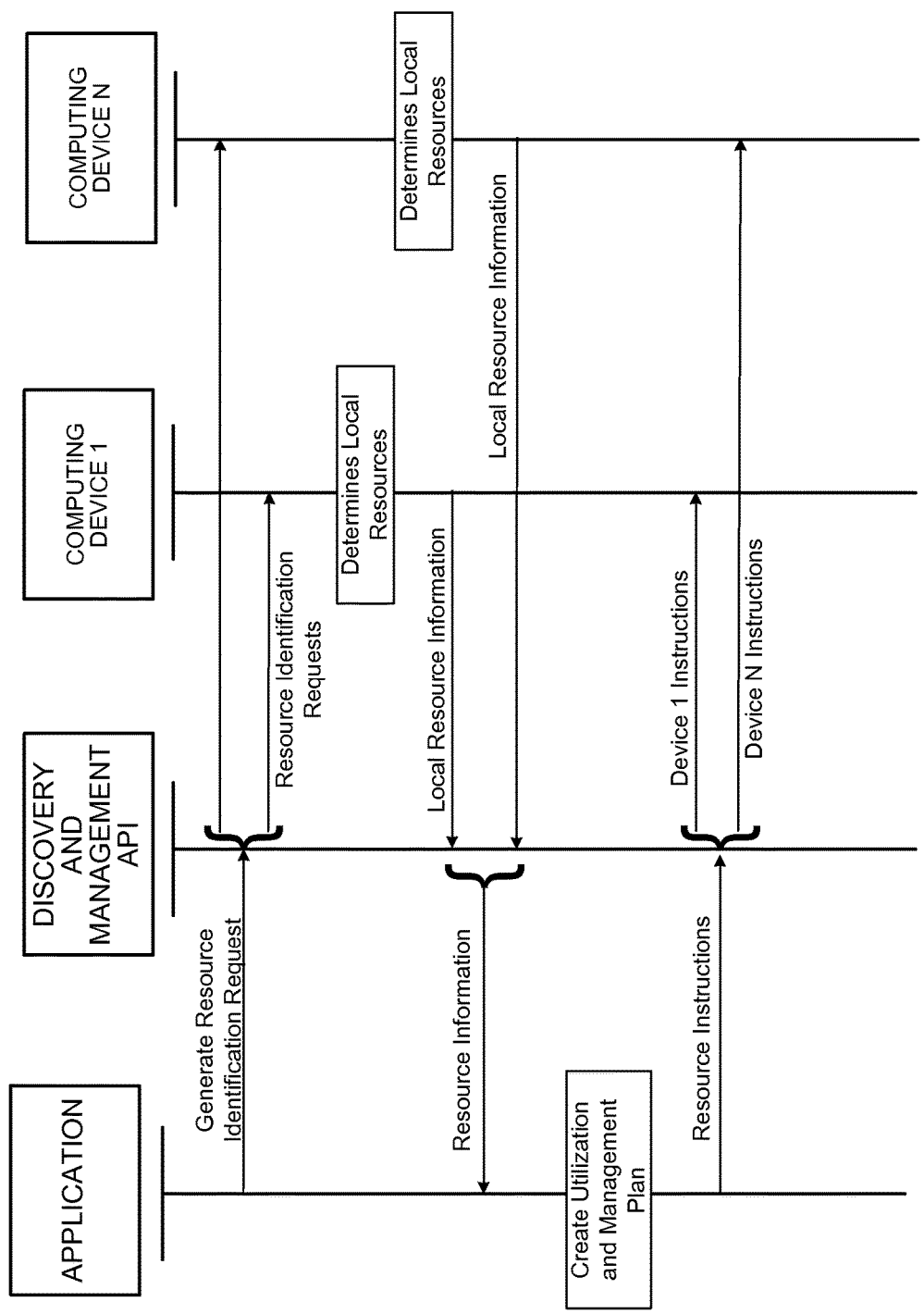
FIG. 6 is a sequence diagram illustrating communications between an application and the multiple computing devices using a device discovery application programming interface in accordance with some embodiments of the technology.

FIG. 6 is a sequence diagram illustrating communications between an application and the multiple computing devices using a device discovery application programming interface in accordance with some embodiments of the technology. As illustrated in FIG. 6, an application can generate a resource identification request using a resource discovery and utilization API. Resource identification requests are then generated using the API and transmitted to the computing devices. These resource identification requests may be generic or customized to each device.

Once the computing devices receive the resource identification requests, the computing devices can determine the local resources. This local resource information is then passed back to the application using the resource discovery and utilization API. The application can create a utilization and management plan. Then, using the resource discovery and utilization API, resource utilization instructions can be communicated to the individual computing devices.

Exemplary Computer System Overview

Figure 7:
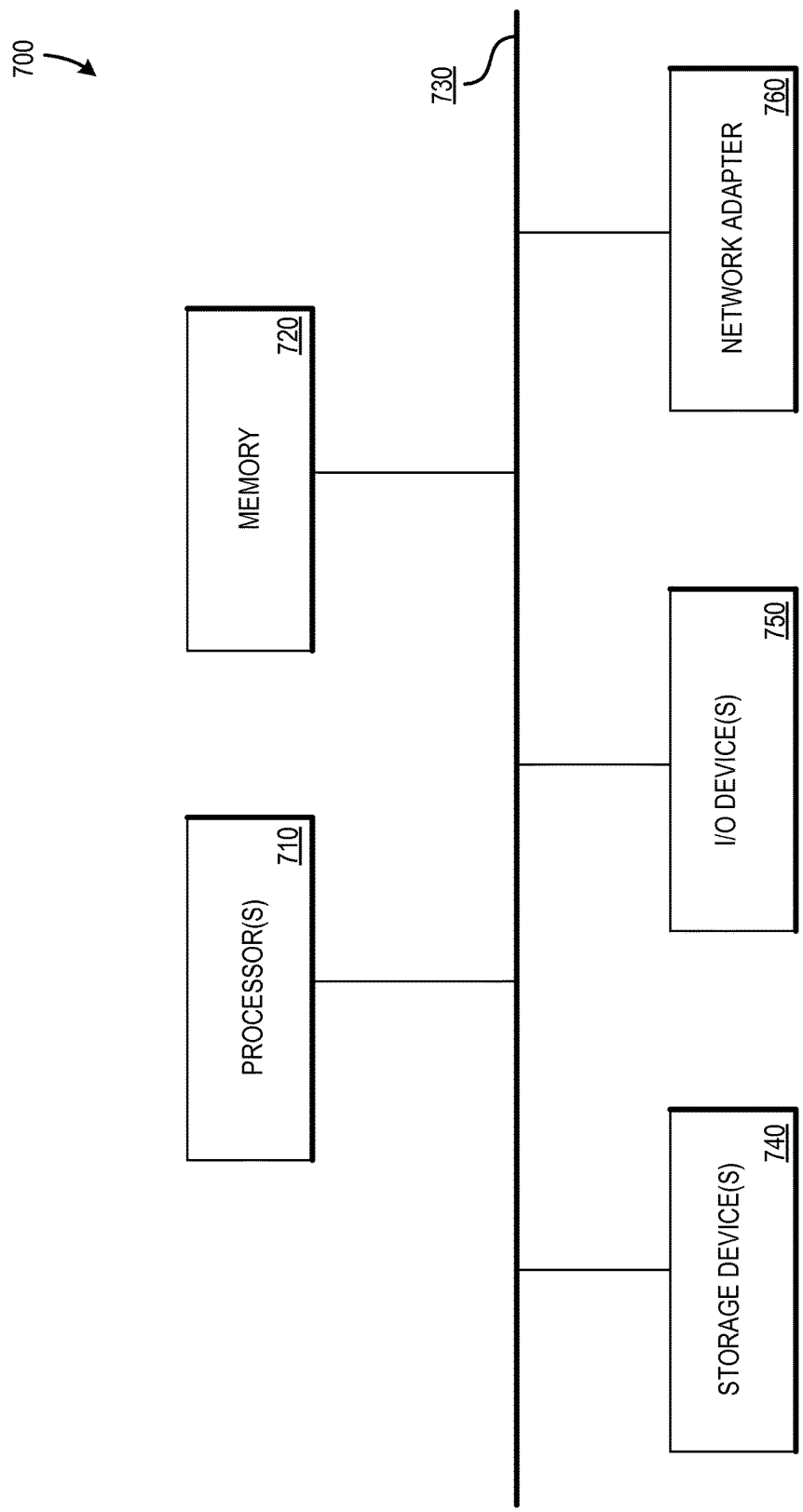
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may include one or more central processing units ("processors") 710, memory 720, input/output devices 750 (e.g., keyboard and pointing devices, display devices), storage devices 740 (e.g., disk drives, flash memory, etc.), and network adapters 760 (e.g., network interfaces) that are connected to an interconnect 730. The interconnect 730 is illustrated as an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus, also called "Firewire", or any type of cellular, IP-based or converged telecommunications network, including but not limited to Global System for Mobile Communications (GSM), Worldwide Interoperability for Microwave Access (WiMAX), etc.

The memory 720 and storage devices 740 are computer-readable storage media that may store instructions that implement at least portions of the described technology. In addition, the data structures and message structures may be stored or transmitted via a data transmission medium, such as a signal on a communications link. Various communications links may be used, such as a point-to-point dial-up connection. Thus, computer readable media can include computer-readable storage media (e.g., "non-transitory" media) and computer-readable transmission media.

The instructions stored in memory 720 can be implemented as software and/or firmware to program the processor(s) 710 to carry out actions described above. In some embodiments, such software or firmware may be initially provided to the processing system 700 by downloading it from a remote system through the computing system 700 (e.g., via network adapter 760).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that the same thing can be said in more than one way. For example, one will recognize that "memory" is one form of "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the technology. Accordingly, the technology is not limited except as defined by the appended claims.

What is claimed is:

1. A computer-implemented method comprising:
receiving, at a first computing device of three or more computing devices having a decentralized operating system spanning the three or more computing devices, a resource identification request from an application running on the decentralized operating system, the resource identification request asking the first computing device and a second computing device of the three or more computing devices to identify available local resources;
identifying, at the first computing device, local resources available for utilization by the application running on the decentralized operating system in response to the resource identification request;
generating, using a processor of the first computing device, a first resource message identifying the local resources available at the first computing device, wherein the first resource message is generated in accordance with a peripheral device discovery application programming interface used by the decentralized operating system, wherein the first resource message includes a network latency to communicate with the first computing device; and sending, over a network, the first resource message from the first computing device to the application running on the decentralized operating system, wherein a first set of resources from the first computing device and a second set of resources from the second computing device of the three or more computing devices are combined to perform a function of the application based on the first resource message and a second resource message identifying local resources available at the second computing device, wherein the first and second set of resources are selected together from the local resources available at the first computing device and the second computing device to perform the function of the application based on network latency to respective computing device, wherein the application uses the first resource message and the second resource message to create a resource utilization plan that utilizes at least two of the three or more computing devices in a cooperative manner.

2. The computer-implemented method of claim 1, wherein the application running on the decentralized operating system generates the resource identification request using the peripheral device discovery application programming interface to request information from the three or more computing devices.

3. The computer-implemented method of claim 1, wherein the first resource message includes a physical location of the first computing device, capabilities of the set of local resources, and a power source of the first computing device.

4. The computer-implemented method of claim 1, wherein the resource utilization plan comprises the set of resources selected from the three or more computing devices based on physical location, capabilities of local resources, and power sources.

5. The computer-implemented method of claim 1, wherein the resources have a resource classification.

6. The computer-implemented method of claim 5, wherein the resource classification from the at least two of the three or more computing devices includes at least one of: a camera, microphone, processor, memory, antenna, input device, display screen, speaker, global positioning system receiver, accelerometer, light, compass, gyroscope, port, or environmental sensor.

7. The computer-implemented method of claim 1, wherein each of the three or more computing devices includes a local operating system kernel that detects and manages, in accordance with instructions from the decentralized operating system, local resources.

8. A non-transitory computer-readable storage medium containing a set of instructions, that when executed by one or more processors, are capable of causing a computing device of three or more computing devices having a decentralized operating system spanning the three or more computing devices to:
receive a resource identification request from an application running on the decentralized operating system, the resource identification request asking the computing device and at least one additional computing device of the three or more computing devices to identify available local resources;
identify local resources available for utilization by the application running on the decentralized operating system in response to the resource identification request;
generate a first resource message identifying the local resources, wherein the first resource message is generated in accordance with a peripheral device discovery application programming interface used by the decentralized operating system, wherein the first resource message includes a network latency to communicate with the computing device;
send the first resource message to the application running on the decentralized operating system, wherein a first set of resources from the computing device and a second set of resources from the at least one additional computing device of the three or more computing devices are combined to perform a function of the application based on the first resource message and a second resource message identifying local resources available at the at least one additional computing device, wherein the first and second set of resources are selected together from the local resources available at the computing device and the at least one additional computing device to perform the function of the application based on network latency to respective computing device, wherein the application uses the first resource message and the second resource message to create a resource utilization plan that utilizes at least two of the three or more computing devices in a cooperative manner; and
control the first set of resources, in cooperation with the second set of resources from the at least one additional computing device, to perform the function of the application based on an instruction from a kernel of the decentralized operating system.

9. The non-transitory computer-readable storage medium of claim 8, wherein the set of instructions, that when executed by the one or more processors, further cause the computing device to:
monitor for an addition or removal of a local resource; and
upon detecting the addition or removal of the local resource, identify the local resources available for utilization by the application running on the decentralized operating system.

10. The non-transitory computer-readable storage medium of claim 8, wherein the set of instructions, that when executed by the one or more processors, further cause the computing device to
determine a physical location of the computing device,
determine the network latency to communicate with the computing device,
determine capabilities of the set of local resources, and
determine a power source currently being utilized by the computing device.

11. The non-transitory computer-readable storage medium of claim 8, wherein the set of instructions, that when executed by the one or more processors, further cause the computing device to store at least a portion of a library of the decentralized operating system, wherein the first set of resources is controlled using the stored portion of the library of the decentralized operating system.

12. A computing device for inclusion in three or more computing devices having a decentralized operating system spanning the three or more computing devices, the computing device comprising:
one or more processors;
one or more non-transitory computer-readable media storing instructions which, when executed by the one or more processors, program the one or more processors to perform operations including:
receiving, at the computing device, a resource identification request from an application running on the decentralized operating system, the resource identification request asking the computing device and at least one additional computing device of the three or more computing devices to identify available local resources;

identifying, at the computing device, local resources available for utilization by the application running on the decentralized operating system in response to the resource identification request;

generating, by the one or more processors of the computing device, a first resource message identifying the local resources available at the computing device, wherein the first resource message is generated in accordance with a peripheral device discovery application programming interface used by the decentralized operating system, wherein the first resource message includes a network latency to communicate with the computing device; and sending, over a network, by the one or more processors, the first resource message from the computing device to the application running on the decentralized operating system, wherein a first set of resources from the computing device and a second set of resources from the at least one additional computing device of the three or more computing devices are combined to perform a function of the application based on the first resource message and a second resource message identifying local resources available at the at least one additional computing device, wherein the first and second set of resources are selected together from the local resources available at the computing device and the at least one additional computing device to perform the function of the application based on network latency to respective computing device, wherein the application uses the first resource message and the second resource message to create a resource utilization plan that utilizes at least two of the three or more computing devices in a cooperative manner.

13. The computing device of claim 12, wherein the application running on the decentralized operating system generates the resource identification request using the peripheral device discovery application programming interface to request information from the three or more computing devices.

14. The computing device of claim 12, wherein the first resource message includes a physical location of the computing device, capabilities of the set of local resources, and a power source of the first computing device.

15. The computer-implemented method of claim 12, wherein each of the three or more computing devices includes a local operating system kernel that detects and manages, in accordance with instructions from the decentralized operating system, local resources.

* * * * *